ns Patent [19]

Yates et al.

[11] 3,729,171
[45] Apr. 24, 1973

[54] REVERSIBLE TOWING WINCH AND METHOD FOR OPERATING SAME

[75] Inventors: Lyle F. Yates, Metamora; Hugh C. Morris, Peoria; James L. Schmitt, Washington, all of Ill.

[73] Assignee: Caterpillar Tractor Co., Peoria, Ill.

[22] Filed: June 9, 1971

[21] Appl. No.: 151,367

[52] U.S. Cl. ............... 192/12 A, 192/3.57, 192/4 A, 192/18 A
[51] Int. Cl. .............................................. F16d 67/02
[58] Field of Search ................ 192/4 R, 12 A, 17 A, 192/18 A, 3.57

[56] References Cited

UNITED STATES PATENTS

| | | | |
|---|---|---|---|
| 2,781,879 | 2/1957 | Ebersold | 192/4 R |
| 3,354,994 | 11/1967 | Sieving et al. | 192/18 A |
| 1,960,815 | 5/1934 | Jessen et al. | 192/4 R |
| 3,508,450 | 4/1970 | Richards | 192/18 A |
| 3,651,904 | 3/1972 | Snoy et al. | 192/4 A |

Primary Examiner—Allan D. Hermann
Assistant Examiner—Randall Heald
Attorney—Fryer, Tjensvoid, Feix, Phillips & Lempio

[57] ABSTRACT

A hydraulically controlled towing winch comprises two winch clutches adapted to rotate a cable drum in opposite directions by selective disengagement of one of the clutches. A normally disengaged input clutch is adapted to selectively couple a power input shaft to a bevel gear arrangement of the winch mechanism for operation thereof. A single lever control system may be utilized to selectively control the actuation of the input and winch clutches to place the winch in the following modes of operation: "Reel-out" wherein the input clutch is engaged and only one of the winch clutches is disengaged to pay-out the cable by rotating the drum in a first direction; "Reel-in" wherein the input clutch is engaged and only the other one of the winch clutches is disengaged to rotate the cable drum in an opposite direction; and "Free-spool" wherein both of the winch clutches are disengaged to permit the drum to rotate freely.

24 Claims, 6 Drawing Figures

Patented April 24, 1973

INVENTORS
LYLE F. YATES
HUGH C. MORRIS
JAMES L. SCHMITT

BY
Fryer, Tjensvold, Feix, Phillips & Lempio
ATTORNEYS

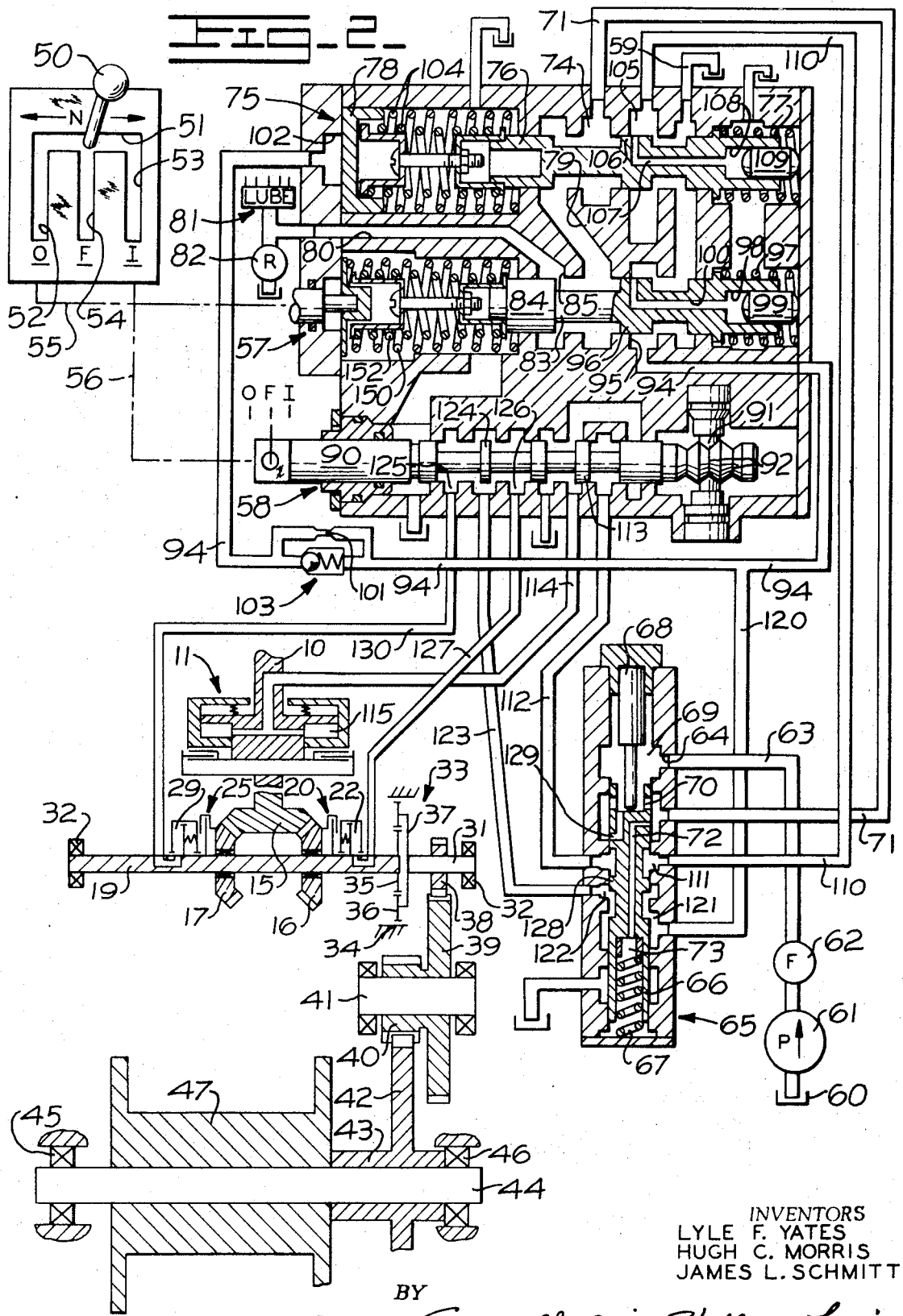

Patented April 24, 1973
3,729,171
4 Sheets-Sheet 3
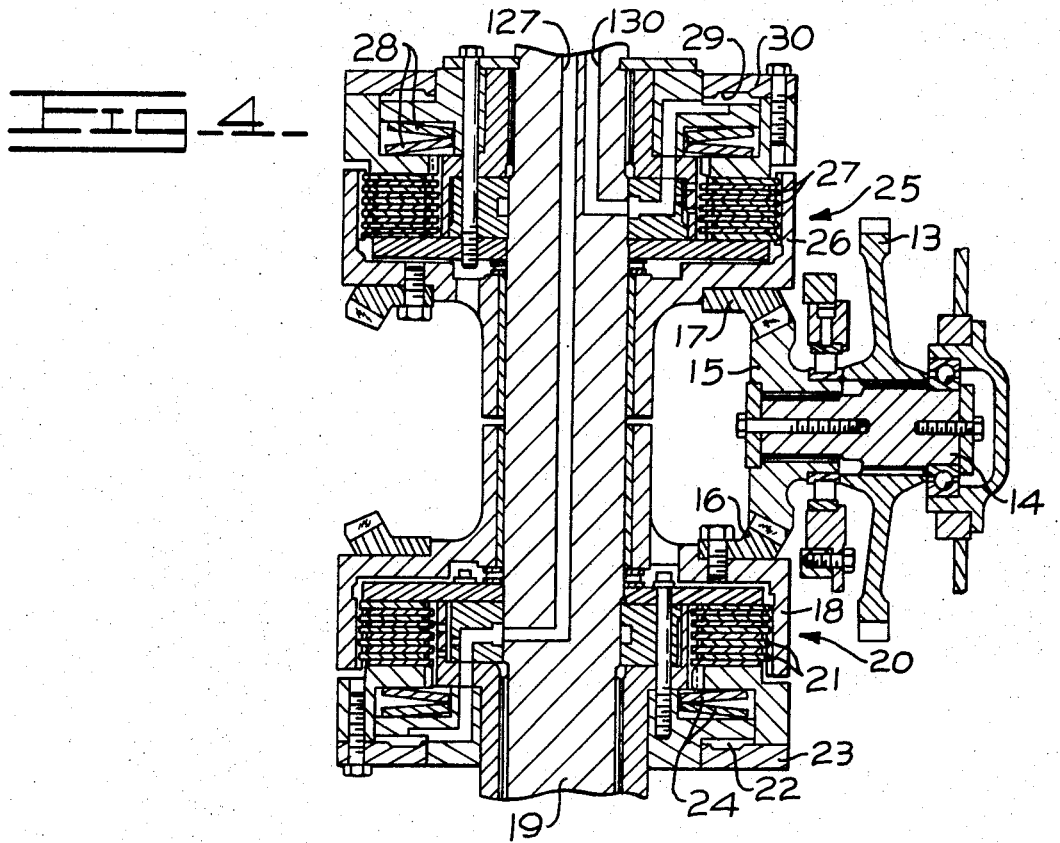
FIG-4-
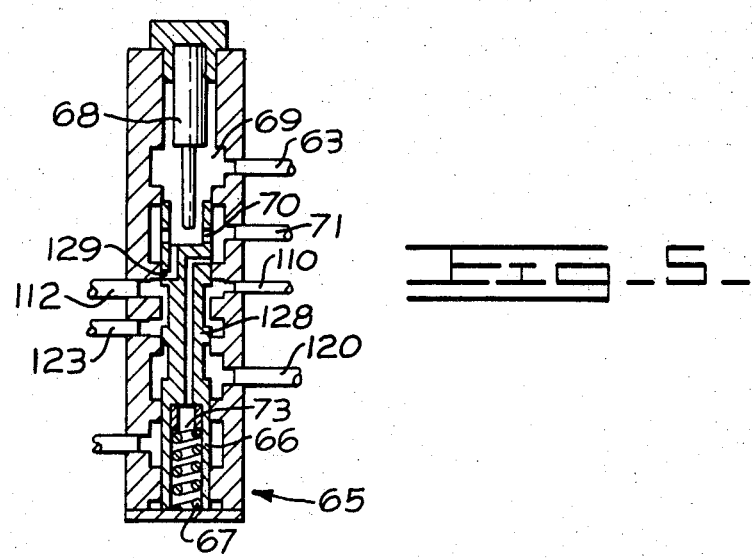
FIG-5-
INVENTORS
LYLE F. YATES
HUGH C. MORRIS
JAMES L. SCHMITT
BY
ATTORNEYS

«3,729,171»

REVERSIBLE TOWING WINCH AND METHOD FOR OPERATING SAME

BACKGROUND OF THE INVENTION

Towing winches are widely used in the construction, logging, pipeline-laying, mining and reclamation industries. Conventional winches are normally actuated by a power take-off from the engine of a machine on which the winch is mounted. Many such winches are unduly complex, expensive to manufacture, prone to mechanical failure when subjected to severe operating conditions and do not always exhibit the safety features required by modern day standards. For example, a typical winch may employ two clutches and a normally engaged friction type brake operatively associated with a cable drum to provide the various operating functions.

SUMMARY AND OBJECTS OF THIS INVENTION

An object of this invention is to overcome the above, briefly described problems by providing an efficient winch and control system therefor which are economical to manufacture, non-complex and exhibit high degrees of structural integrity, safety and service life. The winch comprises a cable drum having two winch clutches operatively associated therewith for permitting the drum to selectively rotate in opposite directions upon sequential disengagement of the clutches. A normally disengaged input clutch is adapted to be actuated to couple a power input means to the winch. A single or three lever control means is adapted to selectively actuate the clutches through suitably arranged valve means for placing the winch in various modes of operation.

BRIEF DESCRIPTION OF THE DRAWINGS

Other objects of this invention will become apparent from the following description and accompanying drawings wherein:

FIG. 2 schematically illustrates the winch and a hydraulic control system therefor;

FIGS. 3 and 4 are sectional views of portions of the drive train employed in the winch;

FIG. 5 is a sectional view of a directional control servo valve of the FIG. 2 control system, shown in a "-high idle" condition of operation.

DESCRIPTION OF THE PREFERRED EMBODIMENTS

Figure 1:
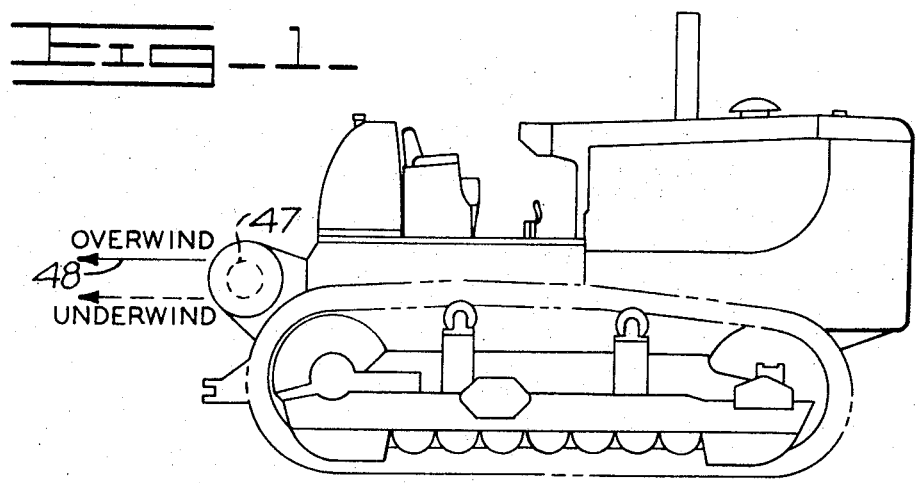
FIG. 1 is a side elevational view of a track-type tractor having a towing winch embodiment of this invention mounted thereon.

The winch embodiment illustrated in FIGS. 1–4 is driven by means of a power input means or shaft 10 comprising standard power take-off from an internal combustion engine (not shown) of the FIG. 1 tractor. A normally disengaged input clutch means 11 (FIG. 3) may be actuated to selectively rotate a gear 12 which meshes with a gear 13 splined to winch input means comprising a rotatable shaft 14. Clutch 11, as well as the two winch clutches hereinafter described, is preferably of the fluid (preferably oil) actuated, friction disc type.

Shaft 14 has a first bevel gear 15 secured to an end thereof which meshes with opposed second and third bevel gears 16 and 17 of the winch input means (FIG. 4). Bevel gear 16 is secured to a carrier 18, rotatably mounted on a shaft 19. The carrier and shaft are adapted to be coupled together by drive means including a first, normally engaged winch clutch means 20 comprising sets of interleaved friction discs 21 alternately mounted for axial movement on the carrier and shaft by standard spline connections. The friction discs are disengaged when a clutch chamber 22 is pressurized to move an annular piston assembly 23 downwardly in FIG. 4. The discs are normally compressed together to engage the clutch by means of back-to-back Belleville type spring washers 24.

Bevel gear 17 is adapted to impart drive through a substantially identical second winch clutch means 25 comprising a carrier 26, rotatably mounted on common shaft 19, and interleaved clutch discs 27 alternately splined for axial movement on the carrier and shaft. Belleville type spring washers 28 normally engage the clutch whereas pressurization of an actuating chamber 29 will disengage same by moving a piston assembly 30 upwardly in FIG. 4. When both clutches 20 and 25 are engaged, the drive train is locked, which prevents a cable drum 47 from rotating.

When only second winch clutch 25 is disengaged, bevel gear 16 will rotate carrier 18 and thus shaft 19 in a first rotational direction. Conversely, when only first winch clutch 20 is disengaged, bevel gear 17 will impart rotation to carrier 26 to in turn rotate shaft 19 in an opposite direction. Pressurization of both chambers 22 and 29 will permit shaft 19 to rotate freely during a "-free spool" mode of winch operation, hereinafter fully described.

Referring to FIG. 2, shaft 19 and a coaxial shaft 31 are mounted for rotation in bearings 32 and connected together by gear reduction means comprising a planetary gear set 33. The conventional planetary gear set comprises a stationary ring gear 34, a sun gear 35, planet gears 36, and a carrier 37 secured to shaft 31. The shaft has a pinion gear 38 secured thereto which meshes with a gear 39, which in turn drives a gear 40 secured to a shaft 41, rotatably mounted in the winch.

Gear 40 meshes with a gear 42 secured to a hub 43, splined or otherwise suitably secured to a shaft 44. The latter shaft is suitably mounted for rotation in spaced stationary bearings 45 and 46 and has a cable drum 47 attached thereto. An optional method not shown would be to mount drum 47 and gear hub 43 on suitable bearings and support shaft 19 in the stationary housing. The cable drum may have a standard cable 48 (FIG. 1) entrained thereon in a conventional manner to perform the various winch operations. Cable 48 can be wound on drum 47 to pass rearwardly from the top or bottom of the drum corresponding to the overwind and underwind conditions shown in FIG. 1.

The FIG. 2 control system comprises a single control lever 50 which may be selectively moved by the operator in slots 51–54 to condition the control system for the following modes of winch operation: "Neutral" (N) wherein the lever is positioned in horizontal slot 51 to engage winch clutches 20 and 25 and to disengage power input clutch 11; "Reel-out" (O) wherein the lever is moved downwardly in slot 52 to disengage one of the winch clutches only and to engage the input clutch to rotate drum 47 in a first direction to pay-out cable therefrom; "Reel-in" (I) wherein the lever is moved downwardly in slot 53 to disengage the second winch clutch only and to engage the input clutch to rotate the drum in a second, opposite direction to reel-in the cable; and "Free-spool" (F) wherein all of the clutches are disengaged to permit the drum to rotate freely.

Control lever 50 is connected by linkage means, schematically illustrated at 55 and 56, to translate the motion thereof to the spools of a pressure control valve 57 and a selector control valve 58, respectively. In particular, horizontal movement of the lever in slot 51 of the double U-shaped shift pattern will only actuate selector control valve 58 whereas vertical downward movement of the lever in slot 52, 53, or 54 will only function to move the spool of pressure control valve 57 rightwardly. The lever is springbiased (not shown) to automatically return it to its FIG. 2 position upon release thereof by the operator.

The integrated control system and functions thereof are best explained by describing the above-mentioned modes of winch operation. During all such modes of operation, a pressurized fluid source, comprising a sump 60 (e.g., the closed chamber of the winch housing which is partially filled with oil), engine driven and positive displacement pump 61 and filter 62, function to communicate pressurized oil to a conduit 63. The conduit communicates with an inlet 64 of a directional control servo valve 65 comprising a spool 66 normally biased upwardly by a coil spring 67 against a stop member 68. During the "Neutral" (N) mode of winch operation wherein lever 50 is positioned in slot 51, both winch clutches are drained and engaged to equally share the load for braking cable drum 47.

FIG. 2 discloses the control system in a neutral-low engine speed (e.g., approximately one-half to one-third rated engine speed) condition of operation wherein the pumped oil is communicated to a chamber 69. Oil is communicated from chamber 69 through orifices 70 and 129 to an outlet conduit 71. Pressure is also communicated through a restricted passage 72 to a spring chamber 73. As will be hereinafter more fully explained, the level of oil pressure in chambers 69 and 73 is different by an amount equal to the pressure required to force the oil through orifices 70 and 129, and passage 72. Thus, it can be seen that if the flow is low (e.g., low engine speed), the force of spring 67 is greater than the pressure difference force and the valve is positioned in the upward position as shown. When the flow increases (e.g., higher engine speed), the pressure difference force is greater than the spring force and spool 66 moves to the downward position. Because of this feature, spool 66 is said to be an engine speed sensing device.

Conduit 71 communicates oil to an inlet 74 of a pressure modulating valve 75. The valve comprises a spool 76 biased leftwardly by a coil spring 77 and adapted to be moved rightwardly by servo-means including a cup-shaped load piston 78.

In the neutral condition shown, pressurized oil from inlet 74 communicates with a passage 79 and a lube passage 80. The lube passage in turn communicates low-pressure oil (e.g., 40 psi) to a lube system or lubrication means 81. A relief valve 82 functions to maintain the lube pressure at an acceptable, safe level. The lube system functions to cool and lubricate the friction discs of the winch and input clutch and to also lubricate the various bearings and gears during all modes of winch operation.

Valves 57 and 75 are identical valves connected in series, except that valve 57 operates by a mechanical means 55 whereas valve 75 moves from hydraulic pressure flowing through a circuit 94 to piston 78 to provide a force on springs 104. Valves 57 and 75 are in series because when valve 75 exhausts, it provides the supply to valve 57.

The first movement of means 55 rightwardly moves pressure control valve 57 comprising a spool 83 rightwardly to compress a spring 97, which closes off to a drain 59 and opens a conduit 94 to supply. Then as pressure builds up in conduit 94, it will reach a level determined by the load of spring 152. When pressure reaches this level, it exhausts to a lube circuit described before, through spool 83 having a land 84 formed thereon which cooperates with an inlet 85 to lube passage 80 to form a variable passage thereat. The size of such passage may be controlled to induce the desired pressure drop thereacross to communicate the lower or downstream pressure to the lube system. It can be seen that pressure in circuit 94 can be controlled by the operator by varying loads on spring 152. Spring 150 serves only to provide operator feel.

When the engine is at "low idle" and lever 50 is moved leftwardly over slot 52 and toward its O position, a spool 90 of selector valve 58 is moved leftwardly by linkage means 56 to its O position to condition the system for the "Reel-out" mode of winch operation. The valve spool is held in such position by means of a spring loaded detent 91 which engages one of three notches 92. Downward movement of the lever to a first position (e.g., twenty percent of the length of slot 52) will function to engage input clutch 11 under full system pressure (e.g., 250 psi) and to retain such pressure throughout full movement of the control lever to its O position at the bottom of slot 52.

Disengagement of first winch clutch 20 is initiated under a lower pressure (e.g., 60 psi) at the above, first position of lever 50. The oil pressure communicated to the first winch clutch preferably increases in direct linear proportion to further downward movement of the control lever. When the lever is in its O position at the bottom slot 52, the oil pressure in chamber 22 of the first winch clutch will be at the maximum 250 psi level.

In particular, handle 50 simultaneously moves spool 83 of pressure control valve 57 rightwardly by linkage means 55 to communicate passage 79 with an outlet conduit 94 via a controlled, variable passage means comprising an annular groove 95 and an annular land 96. The size of the variable passage means may be controlled by manipulating lever 50 in slot 52, 53, or 54 to effect the desired pressure drop thereacross. Spool 83 is biased leftwardly by a coil spring 97 and by oil communicated to a chamber 98, having a positioning slug 99 mounted therein, by means of a passage 100.

The downstream oil in conduit 94 passes through a restricted orifice 101 and into a chamber 102 under the control of a check valve 103. The fluid pressure in chamber 102 initially tends to move load piston 78 rightwardly against the inner one of coil springs 104 to open a passage means comprising an annular groove 105 and a land 106 of spool 76. For example, only a low pressure in chamber 102 is required to move spool 76 towards its input clutch fill position.

Upon opening of the valve, oil is communicated to a passage 107 which in turn communicates with a chamber 108 having a reciprocable slug 109 positioned therein. Thus, the oil pressure in chamber 102, tending to move spool 76 rightwardly, is counteracted by means of springs 77 and 104 and the fluid pressure in chamber 108 to provide means for gradually filling the actuating chamber of the input clutch to prevent abrupt engagement thereof.

Pressurized oil (e.g., 250 psi) is further communicated to a conduit 110, an annular groove 111 of directional control servo valve 65 and an outlet conduit 112. Since spool 90 has been moved leftwardly, a land 113 thereof is positioned to communicate conduit 112 with a conduit 114 to in turn communicate pressurized oil to an actuating chamber 115 of input clutch 11 (FIGS. 2 and 3).

Figure 3:
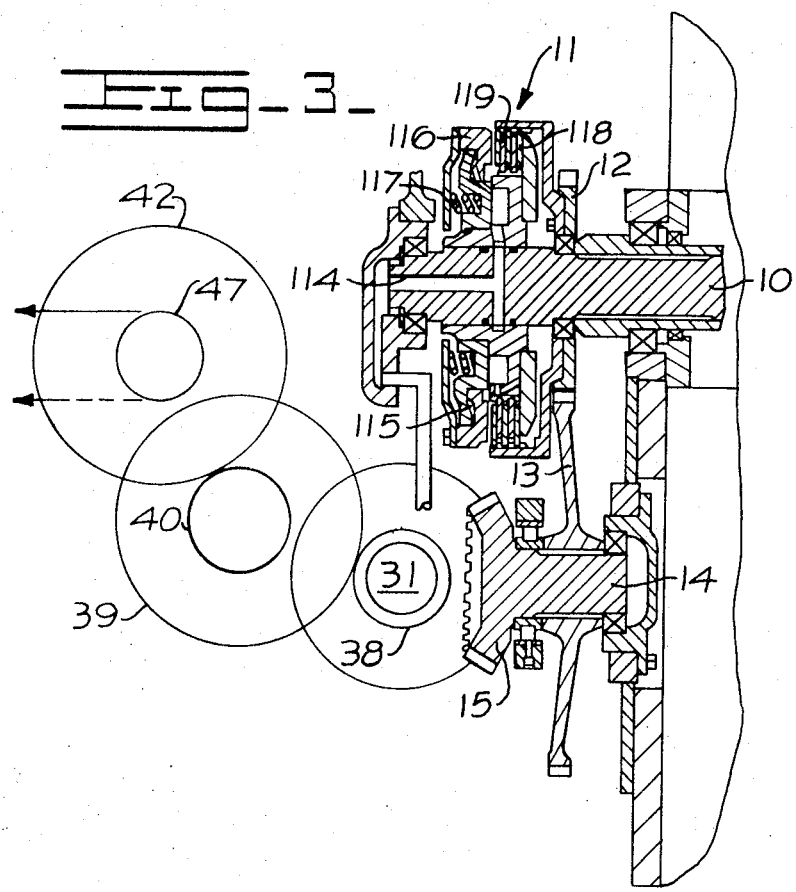

The input clutch further comprises an annular piston assembly 116, biased leftwardly in FIG. 3 by coil springs 117 to normally disengage friction discs 118 and 119. The discs are splined for axial movement on input shaft 10 and ring gear 12, respectively. Conversely, pressurization of chamber 115 compresses the clutch discs together to couple input shaft 10 to winch input shaft 14 and bevel gear 15.

As shown in FIG. 2, conduit 94 further communicates with a branch conduit 120, annular grooves 121 and 122 of valve 65 and an outlet conduit 123. Since spool 90 of valve 58 has been moved to its leftward O position, a land 124 is also moved leftwardly to block an annular groove 125 and to permit conduit 123 to communicate with a groove 126 and a conduit 127. The latter conduit communicates pressurized oil (e.g., 60 psi to 250 psi) to chamber 22 of first winch clutch 20 to permit it to slip or to completely release same. When lever 50 is at its O position to only engage the input clutch and the second winch clutch, cable drum 47 will be rotated in a first direction to pay-out cable therefrom or "Reel-out."

Inching control of the cable drum is achieved during "low idle" by suitably manipulating lever in slot 52. In particular, such manipulation will reciprocate valve spool 83 of pressure control valve 57 to provide inching control means for precisely controlling the pressure drop across the variable orifice comprising groove 95 and land 96. The controlled pressure in conduit 94 (e.g., 60 psi to 250 psi) will thus be communicated to chamber 22 of the first winch clutch to control disengagement and slippage thereof.

When the engine speed is at "high idle" (rated speed or above) and lever 50 is moved to its O position, inching of the winch is prevented automatically by servo-means to prevent burn-out of the clutch discs. During "high idle" the increased oil pressure in chamber 69 of blocking valve 65 will exceed a predetermined level (e.g., 350 psi). In response thereto, spool 66 moves downwardly to automatically and constantly communicate full system pressure (250 psi) to chambers 115 and 22 of the input clutch and first winch clutch, respectively.

In particular, substantially full system pressure is communicated from conduit 110 to both outlet conduits 112 and 123 due to the movement of a blocking land 128 of spool 66 below conduit 123, as shown in FIG. 5. Therefore, the input and winch clutches can only be actuated to an "on" or "off" condition of winch operation and are insensitive to manipulation of spool 83 by lever 50 for winch clutch slippage and "inching" purposes. The above explained inching-at-low-idle and non-inching-at-high-idle conditions of winch operation will also prevail when lever 50 is moved vertically in slot 53 or 54.

It should be further noted in FIG. 5 that an orifice 129 closes during the "high idle" condition of engine operation to increase the pressure drop across orifices 70. The upstream pressure in chamber 69 is continuously maintained at a sufficiently high level to overcome the combined force of the downstream pressure in chamber 73 plus the force of spring 67. Conversely, during "low idle" spool 66 will be continuously raised to its FIG. 2 position by spring 67 due to the combined outflow of fluid through orifices 70 and 129 which effects a lower pressure drop thereacross.

When lever 50 is moved to its "Reel-in" or I position at the bottom of slot 53, valves 57, 65 and 75 will function substantially as above-described. However, selector control valve 58 is actuated to move spool 90 thereof rightwardly to its I position to block annular groove 126. Therefore, inlet conduit 123 from valve 65 communicates with annular groove 125 and thus conduit 130 to communicate pressurized fluid to clutch chamber 29 to release second winch clutch 25. Therefore, the above-described "Reel-out" mode of operation is reversed and the cable drum 47 will rotate in an opposite direction to "Reel-in."

When lever 50 is moved downwardly in slot 54 to the "Free-spool" (F) position, valves 57, 65 and 75 will function substantially as above described. However, spool 90 of selector control valve 58 is now positioned at its intermediate F position whereby land 124 will assume the position illustrated in FIG. 2. Thus, pressurized fluid from conduit 123 will communicate to both outlet conduits 127 and 130 to fully or partially (slip) disengage both of the winch clutches.

In addition, land 113 will be in a blocking position preventing conduit 112 from communicating with conduit 114 to thus prevent engagement of input clutch 11. The winch is now in its "Free spool" condition of operation. As suggested above, the control system could be designed to engage the input clutch during the free-spool mode of operation wherein the winch clutches are disengaged.

Figure 6:
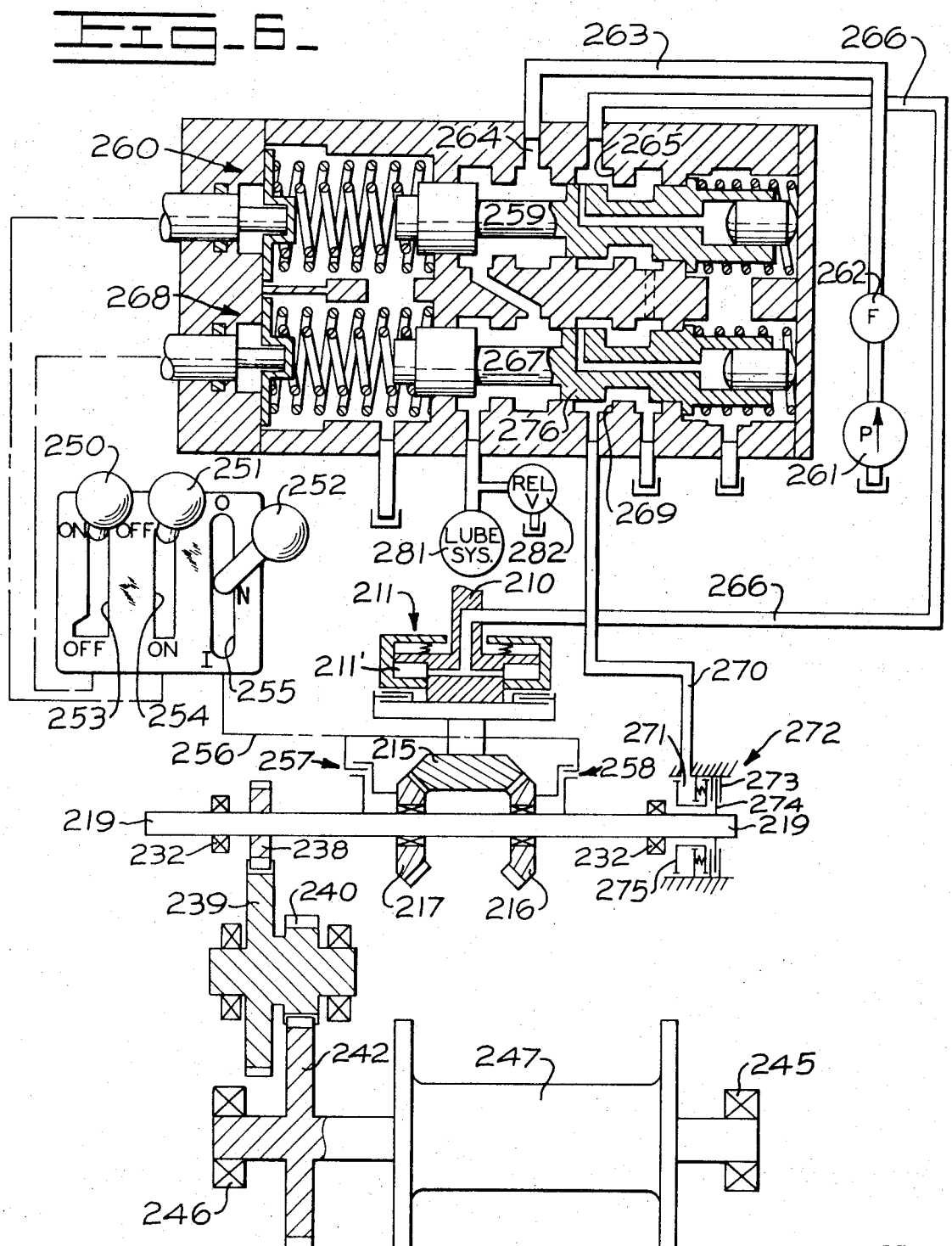
FIG. 6 schematically illustrates an alternative embodiment of the winch and control system of this invention.

FIG. 6 illustrates an alternative embodiment of the winch and control system of this invention. The winch is driven by a power input means or shaft 210 comprising a standard power take-off from an internal combustion engine (not shown). A normally disengaged input clutch means 211 may be actuated to selectively rotate a bevel gear 215. The bevel gear in turn meshes with opposed bevel gears 216 and 217, each rotatably mounted on a shaft 219 by conventional bearing means.

The shaft is rotatably mounted in the winch by spaced bearings 232 and is adapted to drive a pinion gear 238 and speed reduction gears 239, 240, and 242. Gear 242 in turn drives a cable drum 247, mounted for rotation on spaced bearing means 245 and 246. A lube system 281, corresponding to lube system 81, and a relief valve 282 are employed in the system. The relief valve functions to maintain the system's oil pressure at a maximum level of 40 psi, for example.

The last two numerals included in the above "200 series" of numbers between 200 and 249 are common to numerals in FIGS. 1-5 which depict corresponding structures. The FIG. 6 embodiment essentially differs from the FIGS. 1-5 embodiment in that the winch clutches are normally disengaged and three control levers are employed along with an added brake 272.

The three levers 250, 251 and 252 are reciprocally mounted in vertically disposed slots 253, 254 and 255, respectively. Lever 252 is operatively connected by linkage means 256 to axially engageable clutch means 257 and 258. Although the clutches could be of the above-described frictional disc type (such as shown at 20 and 25 in FIG. 4), each clutch preferably comprises an axially movable toothed collar member attached to the linkage means. The teeth of such member interlock with teeth of a second clutch member for positive engagement therewith to mechanically couple bevel gear 216 or 217 to shaft 219 in a conventional manner.

In the illustrated neutral N position of lever 252, both of the clutches are disengaged. Downward movement of lever 252 to its I position will function to engage clutch 257 only to condition the winch for its "Reel-in" mode of operation. Conversely, movement of lever 252 upwardly to its O position will only engage clutch 258 to condition the winch for a "Reel-out" mode of operation.

Downward movement of lever 251 to its "ON" position will function, via suitable linkage means, to move a spool 259 of a directional control valve 260 rightwardly. An engine driven pump 261 communicates pressurized fluid, preferably oil, through a filter 262 and a conduit 263 which terminates at an inlet 264 of valve 260. Since spool 259 has moved rightwardly, an annular groove 265 is uncovered to communicate inlet 264 with an outlet conduit 266 to pressurize an actuating chamber 211' to engage normally disengaged input clutch 211.

Handle 250, when moved downwardly in slot 253 to its "OFF" position, moves a spool 267, via suitable linkage means, of a pressure control valve 268 rightwardly to communicate pressurized fluid from inlet 264 to an annular outlet groove 269. Pressurized fluid from outlet 269 is communicated to a conduit 270 which in turn communicates with an actuating chamber 271 of a normally engaged brake assembly 272 to disengage same. The standard brake assembly may be of the frictional disc and slipping type comprising axially movable but non-rotatable brake discs 273 and axially movable brake discs 274 splined to shaft 219. A spring means (schematically shown) normally engages the brake and will be released by an annular piston 275 which is selectively moved by pressurized oil communicated to actuating chamber 271.

The FIG. 6 winch may be conditioned for the following modes of operation: "Neutral" wherein levers 250, 251, and 252 are in the positions illustrated in FIG. 6 to disengage input clutch 211 and the winch clutches 257 and 258 and to engage brake 272; "Reel-Out" wherein lever 252 is moved to its O position to engage winch clutch 258 only, lever 251 is moved to its "ON" position to engage input clutch 211, and lever 250 is moved to its "OFF" position to release brake 272; "Reel-In" which is identical to the "Reel-Out" sequence except that lever 252 is moved to its I position to engage winch clutch 257 only; and "Free-Spool" wherein levers 251 and 252 remain in their illustrated position and lever 250 is moved to its "OFF" position to release brake 272.

It should be noted that "inching" of the cable drum may be achieved during the "Reel-Out", "Reel-In" and "Free-Spool" modes of winch operation by manipulating lever 250 in slot 253. Such manipulation will control the size of the variable passage means, comprising groove 269 and a land 276, to effect the desired pressure drop thereacross. In response thereto, brake 272 will slip a desired amount to effect the inching function.

What is claimed is:

1. A winch and control system therefor comprising
   a power input means,
   winch input means,
   a normally disengaged input clutch means adapted to be actuated to couple said power input means to said winch input means,
   a cable drum rotatably mounted in said winch;
   drive means for operatively connecting said winch input means to said cable drum to rotate said drum, including first and second winch clutch means, and
   control means, including a single control lever for effecting selective actuation of all of said input and winch clutch means, for simultaneously engaging said input clutch means and for only disengaging said first winch clutch means to rotate said cable drum in a first direction; or for simultaneously engaging said input clutch means and for only disengaging said second winch clutch means to rotate said cable drum in a second direction opposite to said first direction; or for simultaneously disengaging said first and second winch clutch means.

2. The invention of claim 1 wherein each of said clutch means is of the fluid actuated, friction disc type and said winch clutch means are each normally engaged to constitute the sole means for braking said cable drum and are selectively disengaged under fluid pressure by said control means.

3. The invention of claim 1 further comprising normally engaged brake means for selectively preventing rotation of said cable drum and wherein said winch clutch means are each normally disengaged and are alternately engaged by said control means.

4. The invention of claim 3 wherein said control means comprises three separate control levers for respectively effecting actuation of said input clutch means, said first and second winch clutch means and said brake means.

5. The invention of claim 1 wherein said winch input means comprises a first rotatably mounted bevel gear and second and third opposed bevel gears each meshing with said first bevel gear.

6. The invention of claim 5 wherein said second and third bevel gears are rotatably mounted on a common shaft and wherein said first and second winch clutch means normally couple said second and third bevel gears, respectively, to said shaft.

7. The invention of claim 6 wherein said drive means further comprises a gear reduction means operatively connecting said shaft to said cable drum.

8. The invention of claim 2 wherein said control means comprises inching control means for selectively controlling partial engagement and slippage of at least one of said disengaged clutch means.

9. The invention of claim 8 wherein said control means further comprises servo-means responsive to the speed of said power input means for automatically preventing slippage of said disengaged clutch means when said speed exceeds a predetermined amount.

10. The invention of claim 9 wherein said servo-means comprises a directional control servo-valve.

11. The invention of claim 8 wherein said inching control means comprises a manually controlled pressure control valve means.

12. The invention of claim 11 wherein said control means further comprises a selector control valve means and a single lever operatively connected to said selector control valve means and said pressure control valve means to effect simultaneous actuation thereof.

13. The invention of claim 11 further comprising lubrication means for communicating fluid to each of said clutch means and wherein the pressure level of the fluid communicated to said lubrication means is controlled by said pressure control valve means.

14. The invention of claim 2 wherein said control means further comprises a directional control valve and servo-means for automatically controlling the pressure rise in an actuating chamber of said input clutch means.

15. In a winch and control system therefor comprising power input means, a rotatably mounted cable drum operatively connectible to said power input means and means for selectively rotating said cable drum, including inching control means for selectively permitting said cable drum to rotate at a speed independent of the speed of said power input means, the invention comprising servo-means responsive to the speed of said power input means for automatically preventing inching control of said cable drum by said inching control means when the speed of said input means exceeds a predetermined amount.

16. The invention of claim 15 wherein said servo-means comprises a directional control servo-valve.

17. A winch comprising
a power input means, including a first bevel gear,
winch input means including second and third opposed bevel gears rotatably mounted on a common shaft and meshing with said first bevel gear,
a normally disengaged, fluid actuated input clutch means for selectively coupling said power input means to said winch input means,
a cable drum rotatably mounted in said winch,
first and second normally engaged, fluid actuated winch clutch means operatively connecting said winch input means to said cable drum to normally prevent rotation thereof and to rotate said cable drum in opposite directions upon alternate disengagement of said first and second winch clutch means and
control means comprising a single lever control for effecting selective actuation of all of said input and clutch means.

18. The invention of claim 17 wherein each of said input clutch means and said first and second winch clutch means is of the axially compressed, friction disc type.

19. A method for operating a winch, including a cable drum rotatably mounted therein to be driven by a power input means, comprising the steps of
actuating a single lever control for normally engaging first and second fluid actuated friction disc winch clutches to prevent rotation of said cable drum by said power input means and
only disengaging said first winch clutch by fluid pressure and rotating said cable drum by said power input means in a first direction; or
only disengaging said second winch clutch by fluid pressure and rotating said cable drum by said power input means in a second, opposite direction; or
simultaneously disengaging said first and second clutches by fluid pressure to permit said cable drum to rotate freely.

20. The invention of claim 19 further comprising the steps of simultaneously engaging a fluid actuated friction disc input clutch when said first or second winch clutch is disengaged.

21. The invention of claim 19 further comprising the step of manually causing the disengaged winch clutch to at least partially engage and slip.

22. The invention of claim 21 further comprising the step of automatically preventing manual, partial engagement of the disengaged winch clutch when the speed of said power input means exceeds a predetermined amount.

23. A winch and control system therefor comprising
a power input means,
winch input means,
a normally disengaged input clutch means adapted to be actuated to couple said power input means to said winch input means,
a cable drum rotatably mounted in said winch,
drive means for operatively connecting said winch input means to said cable drum to rotate said drum, including first and second winch clutch means,
control means for simultaneously engaging said input clutch means and for only disengaging said first winch clutch means to rotate said cable drum in a first direction; or for simultaneously engaging said input clutch means and for only disengaging said second winch clutch means to rotate said cable drum in a second direction opposite to said first direction; or for simultaneously disengaging said first and second winch clutch means, and
normally engaged brake means for selectively preventing rotation of said cable drum and wherein said winch clutch means are each normally disengaged and are alternately engaged by said control means.

24. The invention of claim 23 wherein said control means comprises three separate control levers for respectively effecting actuation of said input clutch means, said first and second winch clutch means and said brake means.

* * * * *